US007016312B1

(12) United States Patent
Semaan et al.

(10) Patent No.: US 7,016,312 B1
(45) Date of Patent: Mar. 21, 2006

(54) FEATURE BASED CONFIGURATION PROFILES AND ALARM PROVISIONING FOR SONET NETWORKS

(75) Inventors: Ghassan Semaan, Fremont, CA (US); Radha Venkatesh, Sunnyvale, CA (US)

(73) Assignee: CIENA Corporation, Linthicum, MD (US)

( * ) Notice: Subject to any disclaimer, the term of this patent is extended or adjusted under 35 U.S.C. 154(b) by 888 days.

(21) Appl. No.: 09/691,355

(22) Filed: Oct. 17, 2000

(51) Int. Cl.
*H04L 12/56* (2006.01)

(52) U.S. Cl. .................................... 370/254

(58) Field of Classification Search ............... 370/241, 370/242, 244, 245, 254, 907; 709/220, 221, 709/222, 223, 224
See application file for complete search history.

(56) References Cited

U.S. PATENT DOCUMENTS 5,295,139 A * 3/1994 Palmer ........................ 370/255

* cited by examiner

*Primary Examiner*—Ricky Ngo
*Assistant Examiner*—Derrick W Ferris
(74) *Attorney, Agent, or Firm*—Dougherty Clements; Christopher L. Bernard; Tyler S. Brown (57) ABSTRACT

A system for defining configuration profiles for logical entities representing features of elements in a communications network is described. Network elements or features of network elements in a communications system are represented as logical entities. Characteristics associated with the logical entities are defined. Each characteristic may have several possible values. One or more profiles are defined for each logical entity. Each profile specifies a particular value for each characteristic of the logical entity. All of the network elements can be assigned the same profile or different profiles. Two different instances of the same entity can be provisioned with two different profiles. In one embodiment, profiles are defined for failure conditions that can cause the generation of alarm signals. A set of generic profiles that defines the manner in which failures are to be reported is assigned to each specified type of failure.

20 Claims, 5 Drawing Sheets

|  | USER PROFILE | | |
| --- | --- | --- | --- |
| USER CHARACTERISTIC | 0 | 1 | 2 |
| ACCESS PRIVILEGE | UNLIMITED | LIMITED | BLOCKED |
| ACCOUNT TYPE | NO COST | PAY | SUSPENDED |
| QUALITY OF SERVICE | HIGH | MEDIUM | LOW |
| ACCESS PORT | PORTS 1 - 4 | PORT 1 | PORT 4 |

FIG. 5

FEATURE BASED CONFIGURATION PROFILES AND ALARM PROVISIONING FOR SONET NETWORKS

FIELD OF THE INVENTION

The present invention relates generally to communication networks, and more specifically to a system for configuring alarm conditions and network profile characteristics.

BACKGROUND OF THE INVENTION

It is important for telecommunications systems to be able to detect and report most if not all of the various defects and failures that might occur on the equipment and/or on the received signals transmitted over networks. Because of the complexity and extent of present Wide Area Network (WAN) systems, many different types of network failures are possible. For example, failures may be caused by cut cables, network interface device faults, dropped data packets due to protocol errors, and so on. Furthermore, not all faults or errors are of equal severity. For example, some faults, such as dropped packets, may be easier to correct, whereas other types of faults, such as hardware failures or cut transmission lines, may be much more serious. Moreover, different network operators may have different requirements with respect to how network failures and errors are handled. Because of the wide range of possible errors, and different degrees of severity of the faults, telecommunications systems should provide operators with the ability to flexibly monitor and manage the various types of network faults that might occur.

Many present telecommunications systems do provide some degree of error reporting and management. However, these present error reporting systems all possess certain significant disadvantages. Most network management systems provide a default setting of the alarm conditions. This default setting is usually specified by the network vendor or system integrator, and although some systems do allow some provisioning of alarms, many systems do not allow the user to provision the alarms differently than the default setting. This effectively limits the alarm monitoring function to parameters specified by the vendor and does not allow flexible alarm definitions by the user.

Another present alarm monitoring system for communications networks provides a single alarm profile for all of the alarms maintained. Although the user may, in some implementations, be allowed to change this alarm profile, all alarm conditions are treated equivalently. This system does not allow different types of fault conditions to be monitored differently. Other alarm monitoring systems may allow the definition of several alarm profiles. However, these systems typically operate on a system basis and may not allow the definition of alarm conditions on a feature basis.

The disadvantages associated with present methods of monitoring alarm conditions are thus that the alarms are not always user provisionable, and hence the user cannot conveniently change the provisioning of alarms, if necessary. This is especially inconvenient in cases in which certain alarm conditions need to be turned off and back on, or otherwise modified frequently. Moreover, for systems that require all of the alarms of the system to follow a single particular alarm profile, there is usually no flexibility provided in how the alarm conditions are handled.

A further disadvantage associated with present network monitoring functions is that very little accommodation is made to monitor measurable performance or characteristic metrics. For example, present systems typically do not include a provision that allows a user to measure various network characteristics such as performance characteristics, scheduling characteristics, and other such measurable parameters. Furthermore, such systems do not allow system administrators to conveniently define user profiles that define a wide variety of user characteristics and that can be conveniently used to organize and administer new or existing users.

What is needed therefore, is a network monitoring system that allows flexible monitoring of alarm conditions on a feature basis, and that defines and monitors certain measurable network characteristics, such as performance metrics and user profiles.

SUMMARY OF THE INVENTION

A system for defining configuration profiles for logical entities representing features of elements in a communications network is described. Network elements or features of network elements in a communications system are represented as logical entities. Characteristics associated with the logical entities are defined. Each characteristic may have several possible values. One or more profiles are defined for each logical entity. Each profile specifies a particular value for each characteristic of the logical entity. All of the network elements can be assigned the same profile or different profiles. Two different instances of the same entity can be provisioned with two different profiles. In one embodiment, profiles are defined for failure conditions that can cause the generation of alarm signals. A set of generic profiles that defines the manner in which failures are to be reported is assigned to each specified type of failure.

Other embodiments of the invention are directed to defining profiles that define attributes associated with user characteristics or network performance characteristics. Performance threshold values can be assigned for a variety of performance characteristics. If a logical entity exhibits operation that deviates from a given threshold value, an operator is notified of an inconsistent performance characteristic for the network element or feature corresponding to that logical entity.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicates similar elements, and in which.

DETAILED DESCRIPTION OF THE INVENTION

A system for configuring and monitoring network alarm conditions and configurable characteristics in a communications network is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Figure 1:
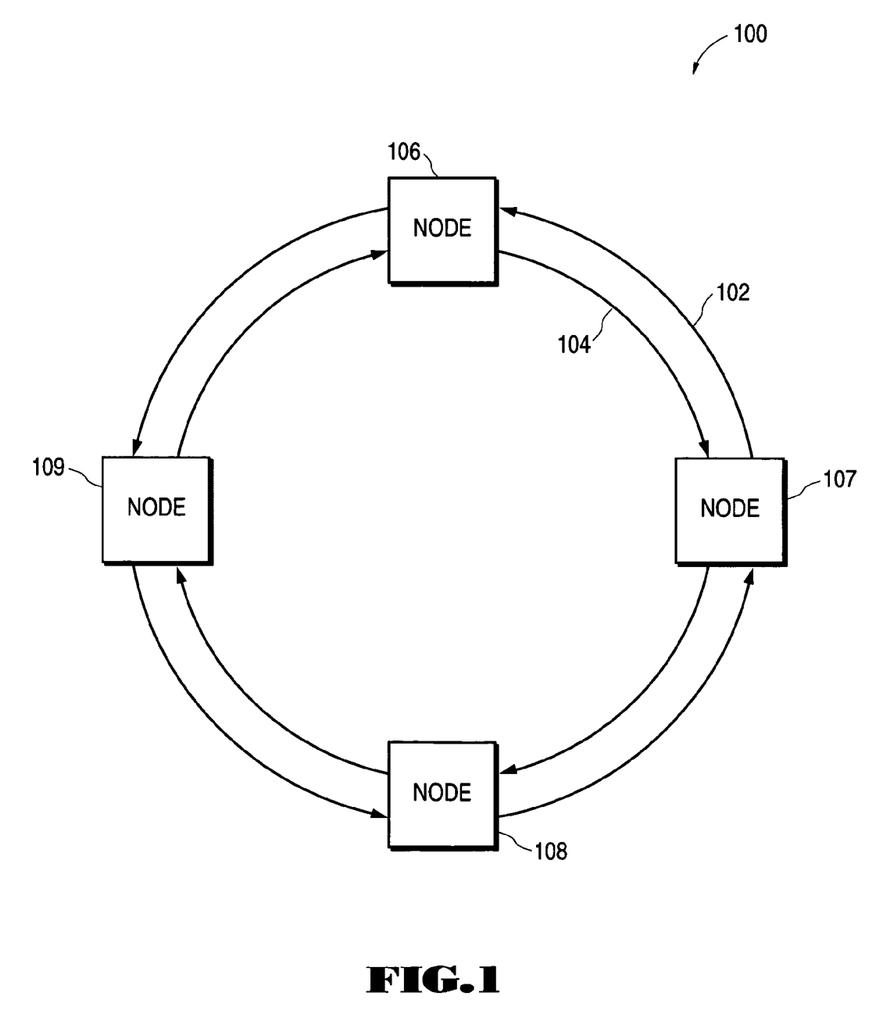
FIG. 1 illustrates a block diagram of a communication network system that implements embodiments of the present invention.

Embodiments of the alarm provisioning and configuration profiling system present invention can be used with various types of network protocols and systems. These networks can be copper or fiber based systems that implement various network protocols such as Internet Protocol (IP), and the like. In an exemplary embodiment, the alarm provisioning system is implemented in a SONET (Synchronous Optical Network) based fiber optic network. SONET networks use two transmission paths between network nodes in a ring configuration. FIG. 1 is an architectural diagram of a SONET ring that implements a logical ring partitioning mechanism, according to one embodiment of the present invention. The SONET network 100 includes nodes 106 through 109 coupled through fiber paths 102 and 104. Each node represents a network element that is typically implemented as, or includes, a digital cross-connect system (DCS) or add-drop multiplexor (ADM). The type of device embodied by the nodes 106–109 depends upon the network environment and application in which the SONET ring is used. An add-drop multiplexor is a network device typically used by telecom carriers to switch and multiplex low-speed voice and data signals onto high-speed lines. These types of nodes are widely used with central office telephone switches and are typically used to aggregate several T1 lines into a higher speed electrical or optical line. A digital cross-connect is used to switch traffic between multiple SONET links, and serves to link high-speed lines to other high-speed lines.

The ring that connects the nodes 106 through 109 together in a SONET network is typically a bi-directional counter-rotating ring. This architecture facilitates the implementation of various protection measures. Any network is susceptible to various types of failures, at least to some degree. Such failures may include node failures, corrupted signals, damaged network lines, and other such failures. To minimize the risk of overall network collapse due to such a problem, a SONET ring includes two or more counter-rotating rings. One ring 104 is referred to as the "working" ring or fiber path and the other ring 102 is referred to as the "standby" or protection ring or fiber path. The working ring typically rotates clockwise and the standby ring rotates counterclockwise around the network, however the actual directions of rotation for these rings may vary depending upon conventions adopted by the equipment manufacturers. The working ring 104 transmits data between the nodes 106–109. In UPSR protected systems, when a failure occurs, the standby ring 102 acts as a backup channel to and carries the bandwidth of the working ring for the network 100. In this manner, a failed node or link section can be bypassed using the appropriate bandwidth capacities of the working and standby rings. FIG. 1 illustrates a simple UPSR (Unidirectional Path Switched Ring) SONET ring topology comprising a two fiber unidirectional network. In this network, all data is transmitted using the bandwidth of the working path while the standby path is idle. When a failure in the working path occurs, the bandwidth of the standby path is utilized to transmit data.

A common implementation of a SONET network is the four fiber bi-directional network in which two separate fiber paths comprise the working ring, and two other separate fiber paths comprise the standby ring. For this topography, one working ring rotates clockwise, and the other rotates counterclockwise. Their respective standby rings rotate in opposite directions to form two separate counter rotating rings through each of the nodes. This type of system is quite robust, and is typically used in large carrier networks that must be well protected against a breakdown.

Other SONET network topographies, such as two fiber bi-directional, or four fiber unidirectional networks are also possible, and can be used in conjunction with embodiments of the present invention.

For the network illustrated in FIG. 1, each node typically has a great deal of traffic passing through it. It is important to be able to monitor any faults that may occur with each node and each link between all nodes. In one embodiment of the present invention, communication network system 100 of FIG. 1 includes a feature based configuration profile and alarm provisioning function that allows an operator to define and monitor various alarm conditions and other configurable network characteristics. Each of the nodes 106 to 109 can generate an alarm based upon a detected failure of a node or line 102 or 104 within the network. For example if the line segment 104 between node 106 and 107 is cut, either or both of nodes 106 and 107 will generate an alarm indicating a path disconnection. In one embodiment of the present invention, different alarm conditions and configurations can be set up for the various types of failures.

Figure 2:
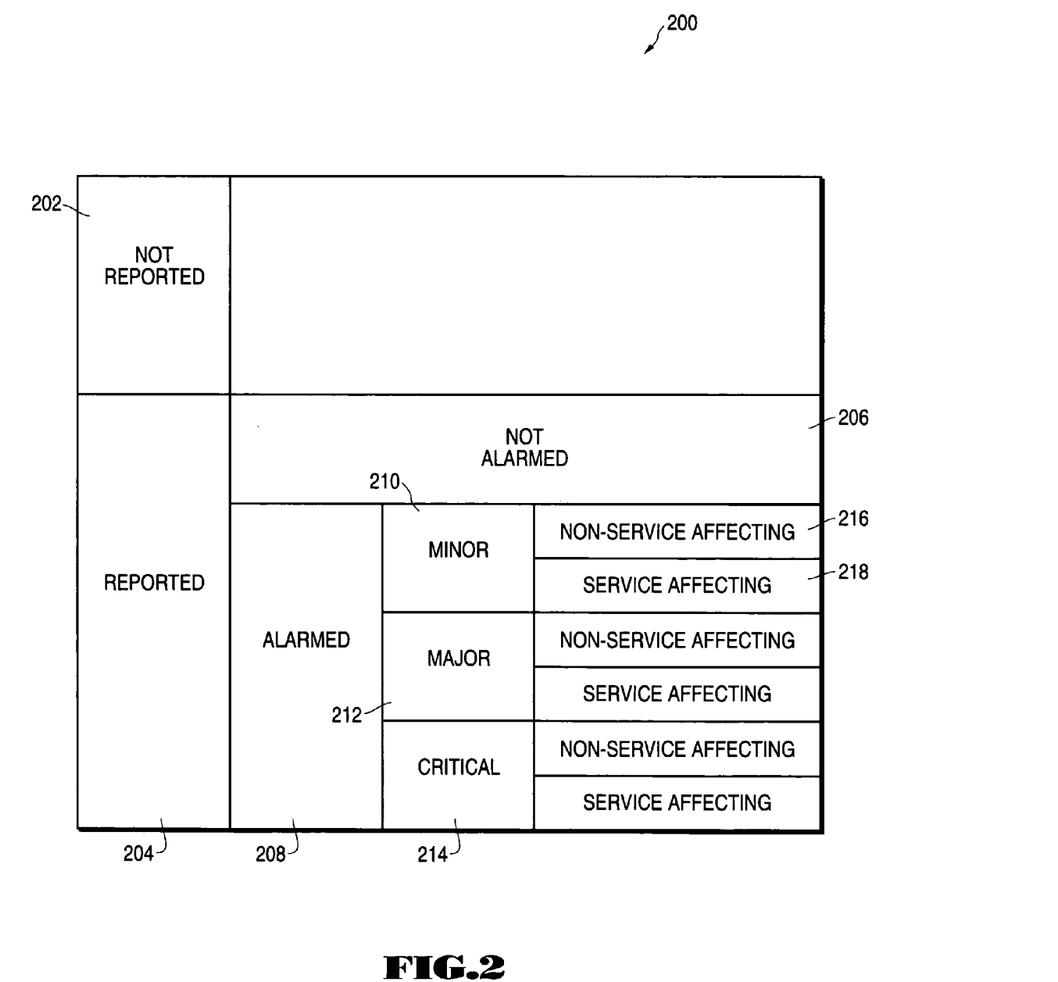
FIG. 2 is a table that illustrates the types of alarm conditions that can be configured for the network of FIG. 1, according to one embodiment of the present invention.

FIG. 2 is a table that illustrates the types of alarm conditions that can be configured for the network of FIG. 1, according to one embodiment of the present invention. As illustrated in table 200, the system is capable of setting any failure as either a "reported" alarm 204 or a "not reported" alarm 202. A failure that is denoted as not reported is not transmitted to the operator upon occurrence of the failure event. If the failure is reported, it is transmitted to the operator upon occurrence of the failure event. A reported failure can either be "alarmed" 208 or "not alarmed" 206. A reported failure that is not alarmed is simply reported to the operator, whereas a reported failure that is alarmed triggers an audio or visual alarm mechanism on one or more of the nodes. An alarm may be implemented as a blinking light or a siren, or similar type of indication means. Each alarmed condition 208 is further classified as "minor" 210, "major" 212, or "critical" 214 event. This categorization indicates the severity of the failure that caused the alarm. Each alarm is also configurable independently of the other alarms as either "service affecting" 218 or "non-service affecting" 216. Thus, as shown in FIG. 2, the alarm provisioning feature establishes a hierarchy of alarm conditions.

In one embodiment of the present invention, all alarm and configurable features of the system are represented by logical entities that reflect the status of the feature and provide a means for the operator to manage this feature. The operator may be represented by an EMS (Element Management System) that is coupled to a node on the network. An entity represents the logical representation of a feature of a physical device on the network. For example, on a SONET network, an entity may represent a physical optical card, such as an OC-48 card, while another entity may represent the OC-48 signal itself, and yet another entity may represent a single STS-1 frame within the OC-48 signal. The granularity of the entities may vary from one system to another, as will be appreciated by those of ordinary skill in the art. Each different entity has associated with it a list of failures. The types of failures depends upon the feature that the entity represents. For example, if the entity represents a optical card, the list of failures may include hardware device failures, cable connection failures, and so on, and this list of failures will be different than the list of failures for the entity representing other types of entities, such as STS frames, and the like. In order to provision the various types of failures that can occur, a profile is associated with each list of failures for each entity. Thus, each entity typically has one profile running at any one time that specifies how the failures for that entity is provisioned. The profile may be set to default provisioning values, and these default values are typically not allowed to be changed by the user.

Figure 3:
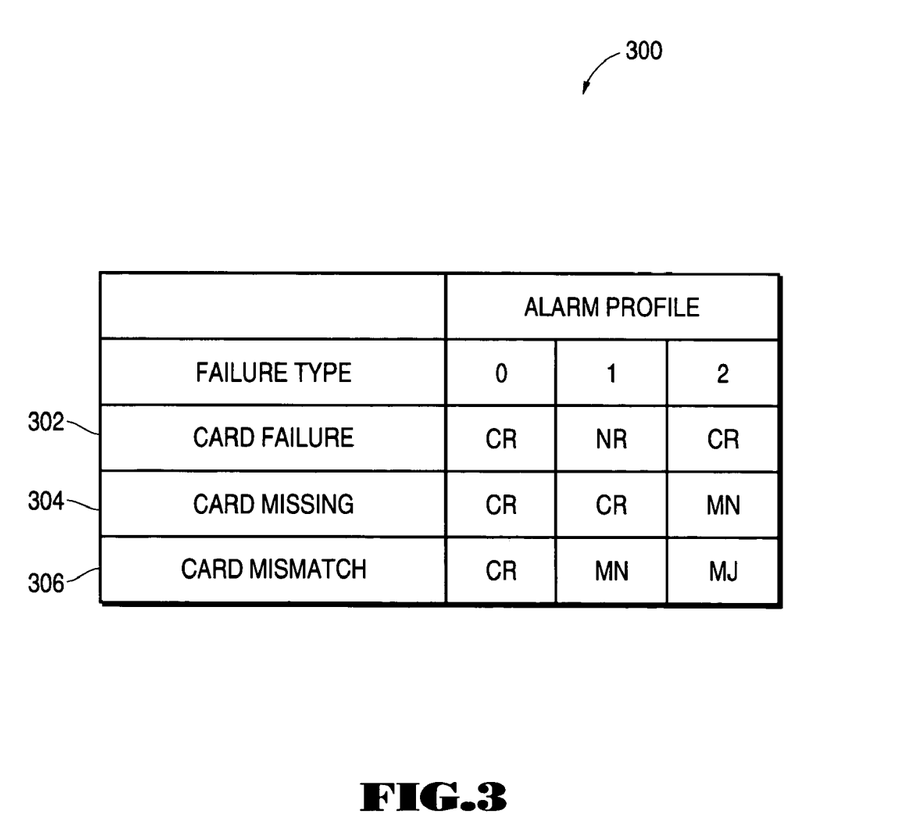
FIG. 3 illustrates an example of different alarm profiles for a particular entity, according to one embodiment of the present invention.

FIG. 3 illustrates an example of different alarm profiles for a particular entity, according to one embodiment of the present invention. In table 300, the entity represents an optical card with a list of failures that defines three possible types of failures. These are Card Failure 302, Card Missing condition 304, and Card Mismatch condition 306. There can be any number of alarm profiles for this entity to specify how the alarms are configured (provisioned) for the various failures. For example, alarm profile 0 specifies that each type of failure is critical, and is therefore reported and alarmed, as illustrated in table 200 of FIG. 2. Alarm profile 1 specifies that a card failure condition is not reported, while a missing card generates a critical alarm, and a mismatched card generates a minor alarm. Likewise, alarm profile 2 specifies that a card failure is critical, while a missing card generates a minor alarm and a mismatched card generates a major alarm. One of the alarm profiles, e.g., alarm profile 0 is a default alarm profile. The operator can modify or add alarm profiles as required. The list of failures and the number of profiles available for each entity, varies depending upon the implementation details for each network. Although any number of profiles is possible, the actual number provided depends upon a number of factors, including network requirements and memory limitations. For hardware devices that are implemented as network cards capable of being installed in card racks with a plurality of slots, each slot may be assigned a different profile. Thus if an optical card is installed in slot 1 it may be assigned one profile, but if the same card is installed in slot 2 it may be assigned a different profile. In general, only one profile is executed on an entity at any one time. A number of different profiles may be created for each entity, but only one profile runs on an entity at a particular time.

For the embodiment in which the network is a SONET node, different alarm profiles for each entity may be defined in relation to the protection mechanisms provided by the SONET protocol. For example, if the standby ring is operational, a card failure of an optical card may be defined within the alarm profile as a minor error, since the SONET protocol will cause traffic to be re-routed appropriately. However, if a problem is detected with the standby ring, the alarm profile for the same optical card may be changed to critical, since the SONET protection mechanisms may be disabled.

Figure 4:
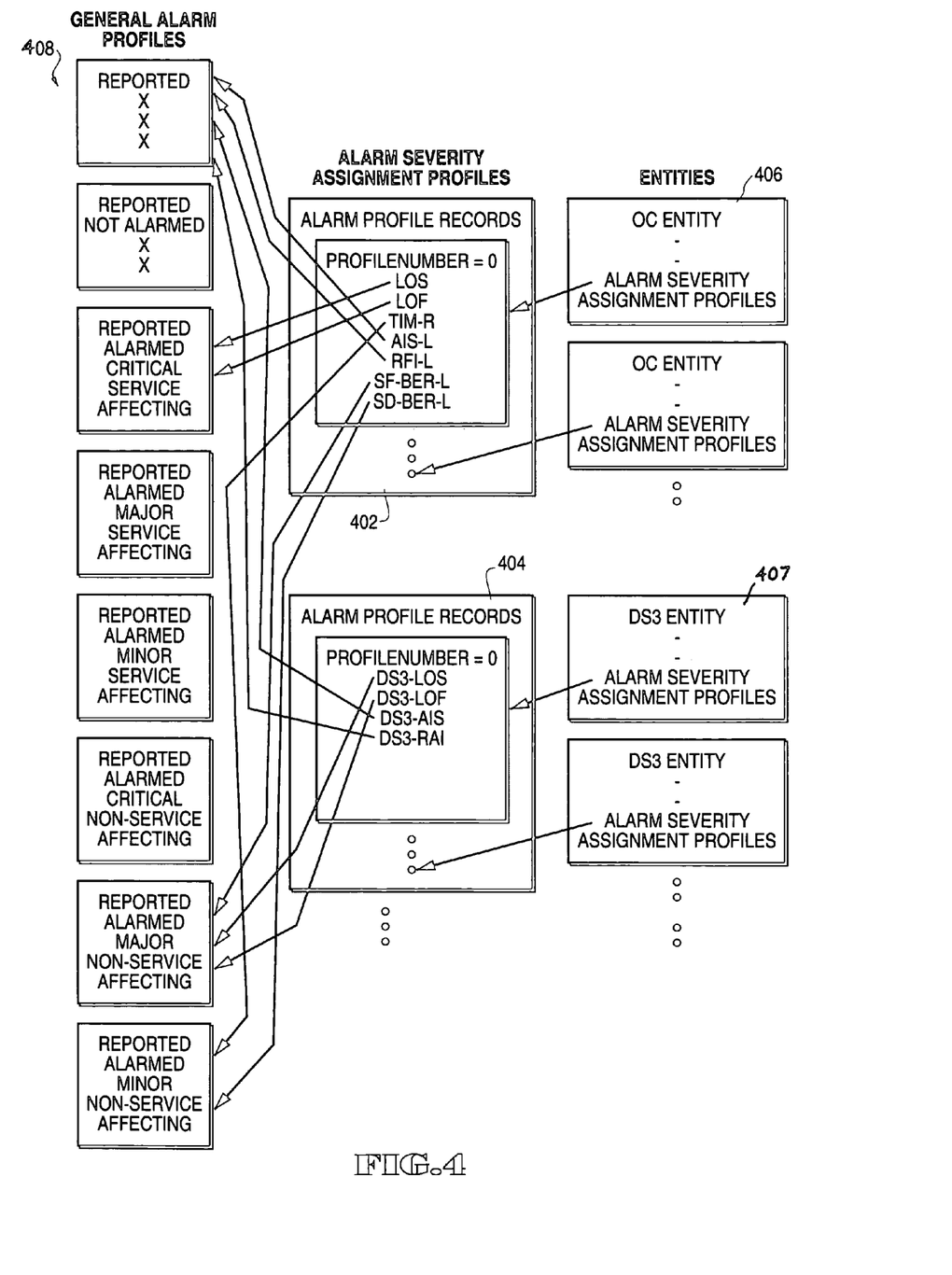
FIG. 4 illustrates different object classes used to implement to a profiling mechanism for alarm conditions, according to one embodiment of the present invention.

In one embodiment, the alarm profiles for each node are maintained in a database stored in each node. Alternatively, the alarm profiles may be stored in an EMS coupled to the network and downloaded to each node. FIG. 4 illustrates different object classes used to implement to a profiling mechanism for alarm conditions, according to one embodiment of the present invention. For example, FIG. 4 shows an optical card (OC) entity (that represents and manages the SONET signal), and a DS3 entity (that represents and manages a DS3 signal).

For each entity, a list of all possible failures is provided. This list is maintained in a particular class object, "EntityNameAlarmProfileRecord". For the example of FIG. 4, the entity names are "OC" 406 and "DS3" 407. Multiple instances of these classes can be created, with one class per desired profile. All profiles of a given entity are maintained within another class called "AlarmSeverityAssignmentProfile". FIG. 4 illustrates an OC Alarm Profile Record 402 and a DS3 Alarm Profile Record 404, with each type contained in a different instance of AlarmSeverityAssignmentProfile. In addition to the profiles created by the operator, each AlarmSeverityAssignmentProfile contains a default profile that contains the vendor configuration of the failures. This default profile can be used by the operator but cannot be changed by that operator. Each entity that generates failures in the system contains a pointer, AlarmSeverityAssignmentPointer that links it to an EntityNameAlarmProfileRecord.

Each failure in each entity is also assigned an alarm severity. This is accomplished by assigning each possible failure condition to a particular GeneralAlarmProfile 408. The GeneralAlarmProfile object class contains the configuration information of a failure corresponding to the alarm configurations shown in FIG. 2. That is, each alarm is configured as "Reported" or "Not Reported", "Alarmed" or "Not Alarmed", and so on. For the embodiment illustrated in FIG. 4, eight instances of the GeneralAlarmProfile class are created upon initialization of the system. These eight instances cover all possible configurations of a failure. Instances of AlarmSeverityAssignmentProfile class are created at system initialization time with the default AlarmProfileRecord in the list. An operator can create more AlarmProfileRecords to describe the abnormal conditions in entities and add them to the list. Based on the type of entity, the operator is able to choose a particular AlarmProfileRecord from the list, and associate each abnormal condition that may exist on that entity with the AlarmProfileRecord.

The operator checks if an AlarmProfileRecord exists that fits the profile that the user wants to use to define the failures in a particular entity. If it does, the operator edits the entity for which the abnormal condition profile is to be changed, to associate it with this AlarmProfileRecord. If not, the operator creates an AlarmProfileRecord that fits the profile. Once the appropriate AlarmProfileRecord exists, the operator edits the entity for which the abnormal condition profile is to be changed, to associate it with this AlarmProfileRecord. The only failures associated with the entity that has just been edited will reflect the changes. Alternatively, the operator edits an existing AlarmProfileRecord that fits the profile. If the entity for which the abnormal condition profile is to be changed is already associated with this AlarmProfileRecord, the entity is not edited. Otherwise, the operator edits the entity for which the failure setting is to be changed, to associate it with this AlarmProfileRecord. After this is done, the failures in all entities that are associated with this AlarmProfileRecord reflect the changes.

The alarm profile configuration illustrated in FIG. 4 allows the definition of alarm characteristics to particular entities, rather than the system as a whole. This allows for individual configuration of alarms for different entities, for example STS entities within a SONET network. Different profiles can be defined per entity and two instances of the same entity can have two different profiles. The number of profiles is virtually unlimited, and new profiles are easily created, since each profile is independent from the others. The number of profiles defined is practically limited by the amount of available memory.

In one embodiment of the present invention, the alarm profile definition for the logical entities can be implemented to create profiles for network characteristics other than failure conditions. Examples of such implementations include user profiles or performance characteristic profiles. For user profiles, a list of user characteristics is provided. This list of characteristics specifies various functional parameters associated with users, and can include attributes such as user ID, network access privileges, account information, and so on. Different profiles can be defined for the various users. For example, a first profile may allow users unlimited access to network resources, while a second profile may allow only limited access to network resources.

Figure 5:
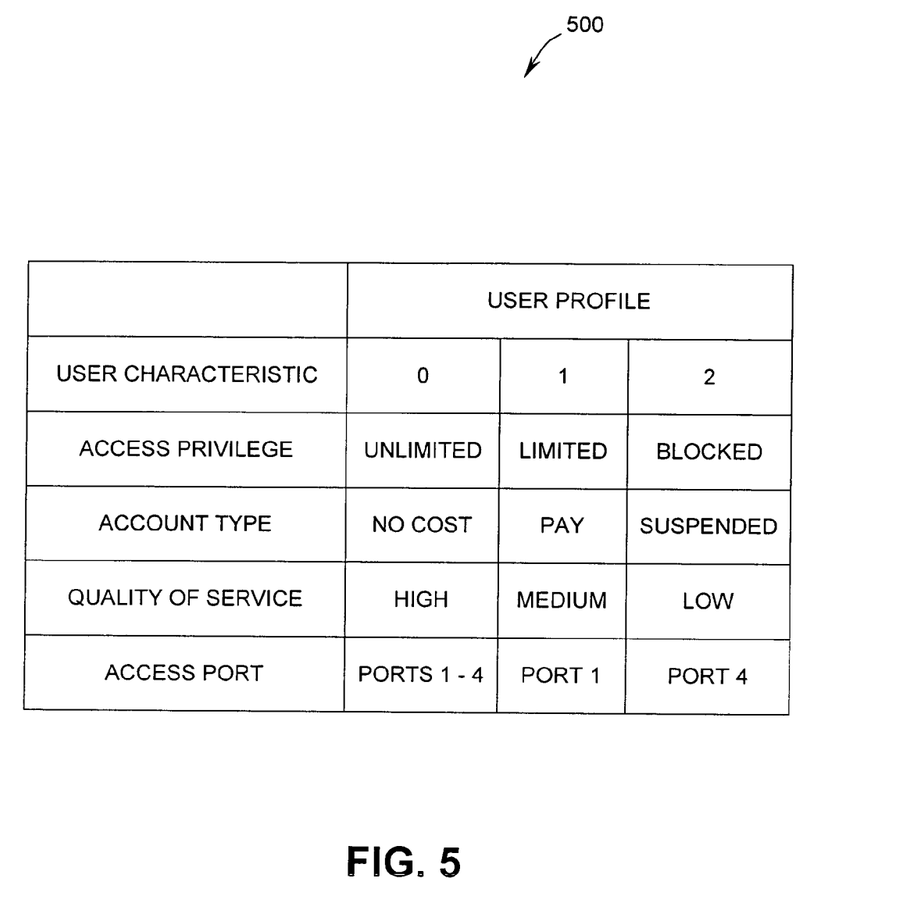
FIG. 5 illustrates an example of different user profiles for particular users, according to one embodiment of the present invention.

FIG. 5 illustrates an example of different user profiles for particular users, according to one embodiment of the present invention. In table 500, different user characteristics are defined for the users. These characteristics may include access privileges for the user, user account information, and quality of service available to the user, among other such characteristics. For each user characteristic various user profiles can be defined. As illustrated in FIG. 2, user profile 0 allows a user unlimited access with a no cost account and a high quality of service. For user profile 1, a user has limited access privileges, and a payment account, with a medium quality of service. For user profile 2 may have access privileges that are blocked and a suspended account with low quality of service. Different users may be assigned different user profiles. For example Users A and B may be supervisory users who are assigned user profile 0, while users C and D may be account based users who are assigned user profile 1. The operator can modify or add user profiles as required and customize user profiles to suit individual users. One particular attribute that can also be defined for each user is an access port address. Certain networks may limit user access through particular gateway nodes for security reasons. The user profile can also include this type of attribute. The list of user characteristics and the number of profiles available for each user varies depending upon the implementation details for each network.

The alarm profiling provision of the present invention can also be extended to allow monitoring and management of performance characteristics of the network. For example, each node may measure the throughput of a particular type of data packet. A profile may be defined that specifies a median throughput for this data packet type. Each instance in which the median value is exceeded may be measured to obtain a measure of increased throughput characteristics for that entity. Such a performance profiling mechanism can be used to monitor and provision certain bandwidth characteristic of the network entities. For example, if an entity defining a particular node is assigned a profile that specifies a particular transmission rate, and this transmission rate is exceeded, a notification may be sent to the operator to divert traffic to other nodes on the network to improve the bandwidth allocation of the network. For this embodiment, each node may contain registers that store threshold values associated with each performance metric. Each different profile has different threshold values for a particular characteristic.

Although the alarm embodiment described with relation to FIGS. 2 and 3 is directed at a system in which alarm conditions are caused by failures of network elements or links, it should be noted that similar alarm or alert conditions can be defined for other types of conditions in which it is important or desirable to notify the operator or the other nodes of a particular condition or event. For example, a deviation in performance of a network element from a pre-defined profile for that element may cause an alert condition. Similarly, the addition of a new user or modification of an existing user may cause an alert condition such that all nodes in the system are alerted of the change in status of the user. In an alternative embodiment, the user profile definitions can be used to implement and enforce network security functions. Because the attributes of each user are defined and known to each of the network elements, a user that attempts to abuse certain network privileges may cause an alert to be triggered that notifies the system administrator of a potential security problem. For example, if a user attempts to use a suspended account or access resources beyond allowed privileges, an alert may be issued.

In the foregoing, a system has been described for defining alarm and configurable network characteristics. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of identifying and managing network elements in a communication system, the method comprising:
    representing a network element feature as a logical entity;
    defining one or more characteristics associated with the logical entity, which characteristics are related to functional attributes of the represented network element feature with respect to the communication system, wherein each characteristic has a plurality of possible values; and
    defining a plurality of profiles for the logical entity representing the network element feature, wherein each profile assigns a corresponding specific value to each characteristic of the logical entity,
    wherein the one or more characteristics comprise failure conditions associated with the network elements, and wherein the profiles define corresponding alarm severity levels to be generated for each corresponding failure condition.

2. The method of claim 1 wherein the communication system comprises a SONET ring network, and wherein the network elements comprise network interface devices or transmission links between network interface devices.

3. The method of claim 2 wherein the network element feature is a network hardware device.

4. The method of claim 2 wherein the network element feature is a data signal.

5. The method of claim 1 wherein each network element of the communication system is assigned one of the profiles.

6. The method of claim 5 wherein the one or more characteristics further comprise user characteristics associated with users of the network elements, and wherein the profiles also define user attributes for each user.

7. The method of claim 1 wherein the alarm severity levels indicate a type of alarm to be transmitted to a network administrator of the communication system according to the profile and if a corresponding failure condition is detected by the network element represented by the logical entity.

8. The method of claim 1, further including modifying at least one of the profiles for said each characteristic according to a user preference.

9. A method of identifying and managing network elements in a communication system, the method comprising:

representing a network element feature as a logical entity;

defining one or more characteristics associated with the logical entity, which characteristics are related to functional attributes of the represented network element feature with respect to the communication system, wherein each characteristic has a plurality of possible values; and defining a plurality of profiles for the logical entity representing the network element feature, wherein each profile assigns a corresponding specific value to each characteristic of the logical entity, wherein the one or more characteristics comprise performance characteristics associated with the network elements, and wherein the one or more profiles define corresponding alert levels to be generated for each corresponding performance characteristic.

10. The method of claim 9 wherein the alert levels indicate a type of alert to be transmitted to a network administrator of the communication system according to the profile and if a corresponding performance measurement is detected by the network element represented by the logical entity.

11. A network node for use in a communication network, the network node comprising:

means for representing a feature of the network node a logical entity;

means for defining one or more characteristics associated with the logical entity, which characteristics are related to functional attributes of the represented network node with respect to the communication network, wherein each characteristic has a plurality of possible values; and means for defining a plurality of profiles for the logical entity representing the network node, wherein each profile assigns a specific value to each characteristic of the logical entity, wherein the one or more characteristics comprise failure conditions associated with the network node, and wherein the profiles define corresponding alarm severity levels to be generated for each corresponding failure condition.

12. The network node of claim 11 wherein the communications network comprises a SONET network and wherein the network node comprises one of a network interface device and a transmission link between network interface devices coupled to the communications network.

13. The network node of claim 12 wherein the feature of the network node is a network hardware device.

14. The network node of claim 12 wherein the feature of the network node is a data signal.

15. The network node of claim 11 wherein the network node is assigned one of the profiles.

16. The network node of claim 15 wherein the one or more characteristics comprise performance characteristics associated with the network node, and wherein the profiles define corresponding alert levels to be generated for each corresponding performance characteristic.

17. The network node of claim 16 wherein the alert levels indicate a type of alert transmitted to a network administrator of the communication system if a corresponding performance measurement is detected by the network element represented by the logical entity.

18. The network node of claim 15 wherein the one or more characteristics further comprise user characteristics associated with a user of the network node.

19. The network node of claim 11 wherein the alarm levels indicate a type of alarm transmitted to a network administrator of the communication network if a corresponding failure condition is detected by the network element represented by the logical entity.

20. The network node of claim 11, further including means for modifying at least one of the profiles for said each characteristic according to a user preference.

* * * * *